United States Patent
Yu et al.

(10) Patent No.: US 11,434,368 B2
(45) Date of Patent: Sep. 6, 2022

(54) AMMUNITION CARTRIDGE CONTAINING A POLYMER COMPOSITION

(71) Applicant: Ticona LLC, Florence, KY (US)

(72) Inventors: Yuehua Yu, Cincinnati, OH (US);
Xinyu Zhao, Cincinnati, OH (US);
Christopher D. McGrady, Walton, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 17/191,843

(22) Filed: Mar. 4, 2021

(65) Prior Publication Data

US 2021/0301134 A1   Sep. 30, 2021

Related U.S. Application Data

(60) Provisional application No. 63/001,827, filed on Mar. 30, 2020.

(51) Int. Cl.
| | | |
|---|---|---|
| *F42B 5/30* | (2006.01) | |
| *C08L 81/04* | (2006.01) | |
| *F42B 5/313* | (2006.01) | |

(52) U.S. Cl.
CPC ............... *C08L 81/04* (2013.01); *F42B 5/30* (2013.01); *F42B 5/313* (2013.01)

(58) Field of Classification Search
CPC .. F42B 5/30; F42B 5/307; F42B 5/313; C08L 81/02; C08L 81/04; C08L 63/00
See application file for complete search history.

(56) References Cited

U.S. PATENT DOCUMENTS

| | | | |
|---|---|---|---|
| 4,614,157 | A | 9/1986 | Grelle et al. |
| 6,080,822 | A | 6/2000 | Haubs et al. |
| 6,598,536 | B2 | 7/2003 | Burri |
| 7,981,981 | B2 | 7/2011 | Ajbani et al. |
| 8,186,273 | B2 | 5/2012 | Trivette |
| 8,240,252 | B2 | 8/2012 | Maljkovic et al. |
| 8,561,543 | B2 | 10/2013 | Burrow |
| 8,578,919 | B2 | 11/2013 | Macy et al. |
| 8,663,764 | B2 | 3/2014 | Luo et al. |
| 8,850,985 | B2 | 10/2014 | Maljkovic et al. |
| 8,852,487 | B2 | 10/2014 | Feng et al. |
| 9,119,307 | B2 | 8/2015 | Luo et al. |
| 9,262,335 | B2 | 2/2016 | Chen et al. |
| 9,365,718 | B2 | 6/2016 | Luo et al. |
| 9,429,407 | B2 | 8/2016 | Burrow |
| 9,493,646 | B2 | 11/2016 | Luo et al. |
| 9,494,260 | B2 | 11/2016 | Luo et al. |
| 9,758,674 | B2 | 9/2017 | Luo et al. |

(Continued)

OTHER PUBLICATIONS

International Search Report and Written Opinion for PCT/US2021/022553 dated May 27, 2021, 8 pages.

*Primary Examiner* — Jonathan C Weber
(74) *Attorney, Agent, or Firm* — Dority & Manning, P.A.

(57) ABSTRACT

An ammunition cartridge comprising a casing body that defines a hollow interior configured to receive a projectile is provided. The casing body contains a polymer composition that includes a polyarylene sulfide and an impact modifier. The impact modifier includes an epoxy-functionalized polymer. Further, the polymer composition exhibits a notched Charpy impact strength of about 6 kJ/m² or more as determined at a temperature of 23° C. in accordance with ISO Test No. 179-1:2010.

35 Claims, 3 Drawing Sheets

(56) References Cited

U.S. PATENT DOCUMENTS

| | | |
|---|---|---|
| 9,765,219 B2 | 9/2017 | Luo et al. |
| 10,358,556 B2 | 7/2019 | Luo et al. |
| 10,450,461 B2 | 10/2019 | Tu et al. |
| 10,501,626 B2 | 12/2019 | Luo et al. |
| 10,590,273 B2 | 3/2020 | Luo et al. |
| 10,704,871 B2 | 7/2020 | Burrow et al. |
| 10,948,273 B2 | 3/2021 | Burrow et al. |
| 11,215,430 B2 | 1/2022 | Boss et al. |
| 2006/0207464 A1* | 9/2006 | Maljkovic ............... F42B 5/307 102/466 |
| 2010/0004375 A1* | 1/2010 | Lalgudi ................... C08L 81/02 524/502 |
| 2013/0273290 A1* | 10/2013 | Luo ......................... B32B 27/20 428/36.92 |
| 2014/0235784 A1* | 8/2014 | Maljkovic ............... F42B 5/307 524/537 |
| 2017/0058124 A1* | 3/2017 | Luo ......................... C08L 81/02 |
| 2021/0223008 A1 | 7/2021 | Padgett et al. |

\* cited by examiner

AMMUNITION CARTRIDGE CONTAINING A POLYMER COMPOSITION

CROSS REFERENCE TO RELATED APPLICATION

The present application claims filing benefit of U.S. Provisional Patent Application Ser. No. 63/001,827 having a filing date of Mar. 30, 2020, which is incorporated herein by reference in its entirety.

BACKGROUND OF THE INVENTION

Because of the extreme nature of the application, materials used for fabrication of ammunition cartridges must demonstrate excellent mechanical and thermal properties. The prevalent materials for production of cartridge casings for all calibers of ammunition in the world today are metals. Brass is the leading material, followed in smaller amounts by steel and, in limited amounts, aluminum. Brass, steel, and, to a lesser degree, aluminum cartridge casings suffer from a number of disadvantages, the most important of which are heavy weight and corrosion concerns. Aluminum has an added disadvantage of potential explosive oxidative degradation and is thus used only in low-pressure cartridges or in applications that can tolerate relatively thick casing walls. Given these issues, desirable materials for ammunition cartridge casing fabrication would be lightweight and impervious to corrosion while having mechanical properties suitable for use in ammunition applications. A vast amount of effort has been dedicated to designing plastic ammunition cartridges. Despite these attempts, consistent success has not been achieved. For instance, the polymer compositions must be capable of absorbing a relative degree of impact energy during a firing event under a wide variety of operating temperatures. Unfortunately, however, attempts at increasing impact strength often result in increased brittleness and poor flowability, which makes it difficult for the composition to survive the assembly process without a loss of mechanical integrity.

As such, a need currently exists for a polymeric material that can be used for an ammunition cartridge.

SUMMARY OF THE INVENTION

In accordance with one embodiment of the present invention, an ammunition cartridge is disclosed that comprises a casing body that defines a hollow interior configured to receive a projectile. The casing body contains a polymer composition that includes a polyarylene sulfide and an impact modifier. The impact modifier includes an epoxy-functionalized polymer. Further, the polymer composition exhibits a notched Charpy impact strength of about 6 kJ/m2 or more as determined at a temperature of 23° C. in accordance with ISO Test No. 179-1:2010.

Other features and aspects of the present invention are set forth in greater detail below.

BRIEF DESCRIPTION OF THE FIGURES

The present disclosure may be better understood with reference to the following figures.

DETAILED DESCRIPTION

Figure 1:
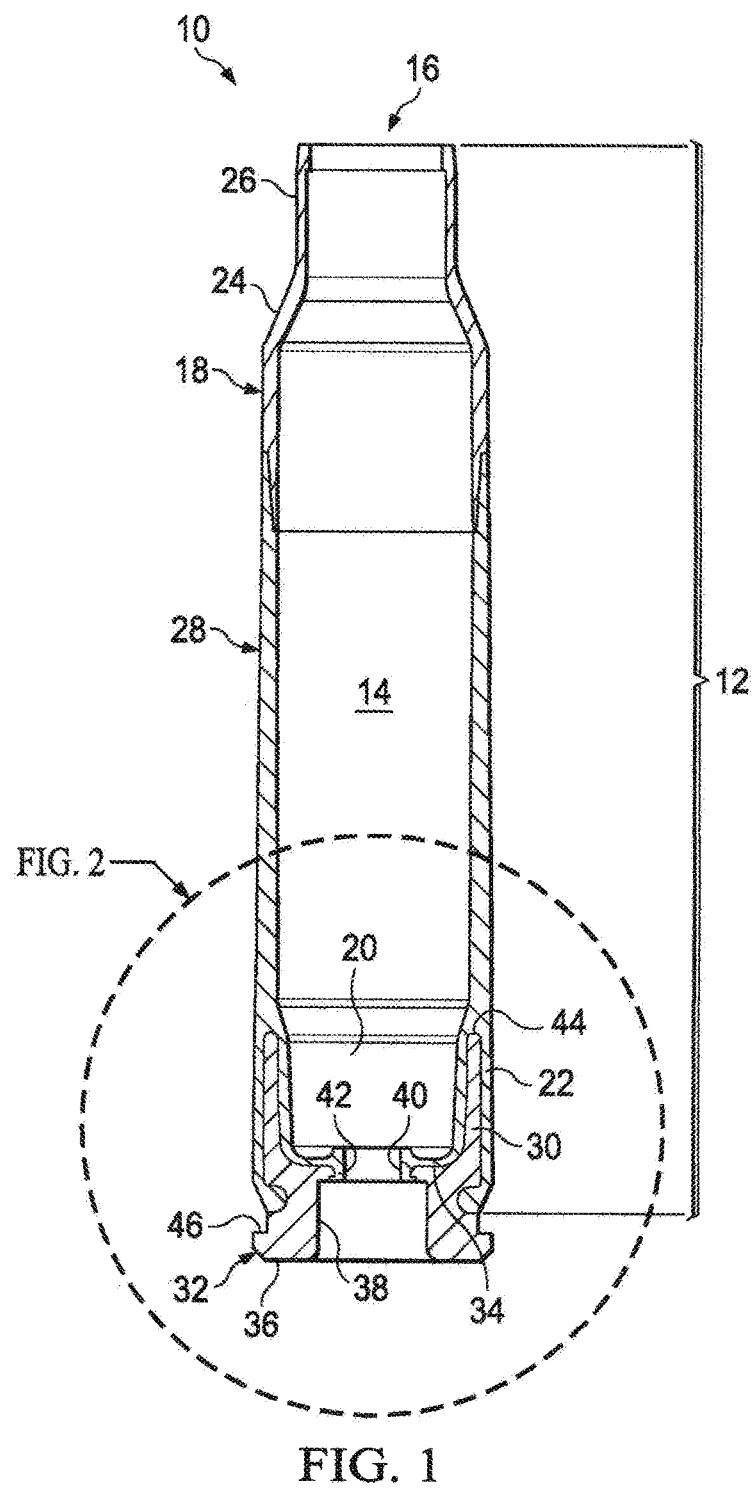
FIG. 1 is a side, cross-sectional view of one embodiment of the ammunition cartridge of the present invention.

It is to be understood by one of ordinary skill in the art that the present discussion is a description of exemplary embodiments only, and is not intended as limiting the broader aspects of the present disclosure.

Generally speaking, the present invention is directed to an ammunition cartridge, that contains a casing body that defines a hollow interior for receiving a projectile. Notably, the casing body contains a polymer composition that includes a polyarylene sulfide in combination with an impact modifier that includes an epoxy-functionalized polymer. The polyarylene sulfide can provide a high degree of corrosion and heat resistance. Moreover, through selective control over the particular nature of these materials and their relative concentration, the present inventors have also discovered that the resulting polymer composition can achieve a high degree of impact strength over a wide variety of temperatures, while still maintaining good ductility and flowability. The polymer composition may, for instance, exhibit a notched Charpy impact strength of about 6 kJ/m$^2$ or more, in some embodiments about 8 kJ/m$^2$ or more, in some embodiments from about 10 to about 150 kJ/m$^2$, in some embodiments from about 20 to about 100 kJ/m$^2$, and in some embodiments, from about 30 to about 80 kJ/m$^2$, as determined at a temperature of 23° C. in accordance with ISO Test No. 179-1:2010 (technically equivalent to ASTM D256, Method B). Beneficially, the polymer composition also has a high degree of thermal resistance and thus can exhibit good properties at both high and low temperatures. For example, the polymer composition can exhibit a notched Charpy impact strength of about 5 kJ/m$^2$ or more, in some embodiments from about 6 to about 100 kJ/m$^2$, and in some embodiments, from about 8 to about 50 kJ/m$^2$, as determined at a temperature of −30° C. in accordance with ISO Test No. 179-1:2010 (technically equivalent to ASTM D256, Method B). The polymer composition may also exhibit very good tensile characteristics. For example, the polymer composition may exhibit a tensile modulus, which is indicative of the ductility of the composition, of about 6,000 MPa or less, in some embodiments about 5,000 MPa or less, in some embodiments about 4,000 MPa or less, in some embodiments about 3,500 MPa or less, in some embodiments from about 500 to about 3,200 MPa, and in some embodiments, from about 1,500 to about 3,000 MPa. The tensile strength may also be about 25 MPa or more, in some embodiments about 30 MPa or more, and in some embodiments, from about 50 to about 200 MPa. Such tensile properties may be determined at a temperature of 23° C. in accordance with ISO Test No. 527:2012 at a test speed of 5 mm/min (technically equivalent to ASTM D638). Of course, in addition to maintaining good mechanical properties, the polymer composition may possess a relatively low melt viscosity, which allows it to readily flow into a mold cavity during production. For instance, the composition may have a melt viscosity of about 6,000 kilipoise (kP) or less, in some embodiments about 5,000 kP or less, in some embodiments about 3,500 kP or less, in some embodiments from about 500 to about 3,000 kP, and in some embodiments, from about 1,000 to about 2,500 kP, as determined in accordance with ISO Test No. 11443:2005 at a temperature of about 310° C. and at a shear rate of 1,200 s$^{-1}$.

Various embodiments of the present invention will now be discussed in more detail.

I. Polymer Composition

A. Polyarylene Sulfide

The polymer composition generally employs at least one polyarylene sulfide in an amount of from about 50 wt. % to about 98 wt. %, in some embodiments from about 60 wt. % to about 96 wt. %, and in some embodiments, from about 80 wt. % to about 95 wt. % of the polymer composition. The polyarylene sulfide may have repeating units of the formula:

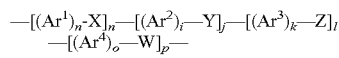

wherein,
$Ar^1$, $Ar^2$, $Ar^3$, and $Ar^4$ are independently arylene units of 6 to 18 carbon atoms; W, X, Y, and Z are independently bivalent linking groups selected from $-SO_2-$, $-S-$, $-SO-$, $-CO-$, $-O-$, $-C(O)O-$ or alkylene or alkylidene groups of 1 to 6 carbon atoms, wherein at least one of the linking groups is $-S-$; and n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide ($-S-$) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure $-(C_6H_4-S)_n-$ (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene, 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihaloaromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or copolymer. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

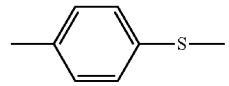

and segments having the structure of formula:

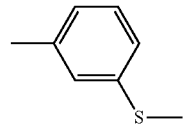

or segments having the structure of formula:

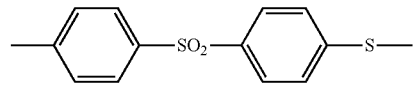

The polyarylene sulfide(s) may be linear, semi-linear, branched or crosslinked. Linear polyarylene sulfides are particularly suitable and may contain 80 mol % or more, and in some embodiments, 90 mol. % or more of the repeating unit $-(Ar-S)-$. Such linear polymers may also include a small amount of a branching unit or a crosslinking unit, but the amount of branching or crosslinking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a crosslinking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

If desired, the polyarylene sulfide can be functionalized. For instance, a disulfide compound containing reactive functional groups (e.g., carboxyl, hydroxyl, amine, etc.) can be reacted with the polyarylene sulfide. Functionalization of the polyarylene sulfide can further provide sites for bonding between the impact modifier and the polyarylene sulfide, which can improve distribution of the impact modifier throughout the polyarylene sulfide and prevent phase separation. The disulfide compound may undergo a chain scission reaction with the polyarylene sulfide during melt processing to lower its overall melt viscosity. When employed, disulfide compounds typically constitute from about 0.01 wt. % to about 3 wt. %, in some embodiments from about 0.02 wt. % to about 1 wt. %, and in some embodiments, from about 0.05 to about 0.5 wt. % of the polymer composition. The ratio of the amount of the polyarylene sulfide to the amount of the disulfide compound may likewise be from about 1000:1 to about 10:1, from about 500:1 to about 20:1, or from about 400:1 to about 30:1. Suitable disulfide compounds are typically those having the following formula:

$$R^3-S-S-R^4$$

wherein $R^3$ and $R^4$ may be the same or different and are hydrocarbon groups that independently include from 1 to about 20 carbons. For instance, $R^3$ and $R^4$ may be an alkyl, cycloalkyl, aryl, or heterocyclic group. In certain embodiments, $R^3$ and $R^4$ are generally nonreactive functionalities, such as phenyl, naphthyl, ethyl, methyl, propyl, etc. Examples of such compounds include diphenyl disulfide, naphthyl disulfide, dimethyl disulfide, diethyl disulfide, and dipropyl disulfide. $R^3$ and $R^4$ may also include reactive functionality at terminal end(s) of the disulfide compound. For example, at least one of $R^3$ and $R^4$ may include a terminal carboxyl group, hydroxyl group, a substituted or non-substituted amino group, a nitro group, or the like. Examples of compounds may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid (or 2,2'-dithiobenzoic acid), dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole), 2-(4'-morpholinodithio)benzothiazole, etc., as well as mixtures thereof.

B. Impact Modifier

Impact modifiers typically constitute from 1 to about 50 parts by weight, in some embodiments from about 2 to about 30 parts by weight, and in some embodiments, from about 5 to about 20 parts by weight per 100 parts by weight of the polyarylene sulfides employed in the polymer composition. For example, the impact modifiers may constitute from about 1 wt. % to about 30 wt. %, in some embodiments from about 2 wt. % to about 20 wt. %, and in some embodiments, from about 5 wt. % to about 15 wt. % of the polymer composition.

The particular nature of the impact modifier may be selected to help achieve the desired balance between melt viscosity, ductility (e.g., tensile modulus), and impact strength. Namely, the impact modifier generally includes an "epoxy-functionalized" polymer, which typically contains on average two or more epoxy functional groups per molecule. One example of such a functional group is an epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate. Regardless of the particular type employed, the relative concentration of the epoxy monomer ("epoxy content") in the overall composition may be selectively controlled to help achieve the desired melt flow rate, ductility, and impact strength. Too low of an epoxy content, for example, may lead to poor interaction with the polyarylene sulfide and thus limit the impact strength of the resulting polymer composition. On the other hand, too high of an epoxy content may impact the overall ductility of the composition. Thus, it is typically desired that the epoxy content of the composition is from about 0.3 to about 1.2 parts by weight, in some embodiments from about 0.45 to about 1 part by weight, and in some embodiments, from about 0.5 to about 0.9 parts by weight per 100 parts by weight of the polyarylene sulfides employed in the polymer composition.

The epoxy-functionalized polymer may also contain other monomeric components as is known in the art. For example, the polymer may contain an olefinic monomeric component that is derived from one or more α-olefins such that the polymer is considered an epoxy-functionalized olefin copolymer. Examples of suitable olefin monomers include, for instance, linear and/or branched α-olefins having from 2 to 20 carbon atoms and typically from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin monomers are ethylene and propylene. The α-olefin monomer(s) may, for instance, constitute from about 55 wt. % to about 95 wt. %, in some embodiments from about 60 wt. % to about 90 wt. %, and in some embodiments, from about 65 wt. % to about 85 wt. % of the copolymer. The epoxy monomer(s) (e.g., epoxy-functional (meth)acrylic monomer(s)) may likewise constitute from about 1 wt. % to about 20 wt. %, in some embodiments from about 2 wt. % to about 15 wt. %, and in some embodiments, from about 3 wt. % to about 10 wt. % of the copolymer.

The epoxy-functionalized olefin copolymer may also contain other monomeric units as is known in the art. For example, another suitable monomer may include a (meth) acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. When employed, such non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer.

The melt flow index of the epoxy-functionalized polymer may also be selectively controlled to help achieved the desired properties. For instance, the melt flow index of the impact modifier may be from about 1 to about 30 grams per 10 minutes ("g/10 min"), in some embodiments from about 2 to about 20 g/10 min, and in some embodiments, from about 4 to about 15 g/10 min, as determined in accordance with ASTM D1238-13 at a load of 2.16 kg and temperature of 190° C. One example of a suitable epoxy-functionalized copolymer that may be used in the present invention is commercially available from Arkema under the name LOTADER® AX8840. LOTADER® AX8840, for instance, has a melt flow index of 5 g/10 min and has a glycidyl methacrylate monomer content of 8 wt. % Another suitable copolymer is commercially available from DuPont under the name ELVALOY® PTW, which is a terpolymer of ethylene, butyl acrylate, and glycidyl methacrylate and has a melt flow index of 12 g/10 min and a glycidyl methacrylate monomer content of 5 wt. %.

If desired, additional impact modifiers may also be employed in combination with the epoxy-functionalized polymer. For example, another suitable impact modifier may include a block copolymer in which at least one phase is made of a material that is hard at room temperature but fluid upon heating and another phase is a softer material that is rubber-like at room temperature. For instance, the block copolymer may have an A-B or A-B-A block copolymer repeating structure, where A represents hard segments and B is a soft segment. Non-limiting examples of impact modifiers having an A-B repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Triblock copolymers may likewise contain polystyrene as the hard segment and either polybutadiene, polyisoprene, or polyethylene-co-butylene as the soft segment. Similarly, styrene butadiene repeating co-polymers may be employed, as well as polystyrene/polyisoprene repeating polymers. In one particular embodiment, the block copolymer may have alternating blocks of polyamide and polyether. Such materials are commercially available, for example from Atofina under the PEBAX™ trade name. The polyamide blocks may be derived from a copolymer of a diacid component and a diamine component, or may be prepared by homopolymerization of a cyclic lactam. The polyether block may be derived from homo- or copolymers of cyclic ethers such as ethylene oxide, propylene oxide, and tetrahydrofuran.

C. Catalyst

If desired, the polymer composition may also contain a catalyst that helps facilitate a reaction between the polyarylene sulfide and the epoxy-functionalized polymer, thus improving compatibility between the materials. In one embodiment, for example, the catalyst may be a metal carboxylate, which is typically a metal salt of a fatty acid. The metal cation employed in the salt may vary, but is typically a divalent metal, such as calcium, magnesium, lead, barium, strontium, zinc, iron, cadmium, nickel, copper, tin, etc., as well as mixtures thereof. Zinc is particularly suitable. The fatty acid may generally be any saturated or unsaturated acid having a carbon chain length of from about 8 to 22 carbon atoms, and in some embodiments, from about 10 to about 18 carbon atoms. If desired, the acid may be substituted. Suitable fatty acids may include, for instance, lauric acid, myristic acid, behenic acid, oleic acid, palmitic acid, stearic acid, ricinoleic acid, capric acid, neodecanoic acid, hydrogenated tallow fatty acid, hydroxy stearic acid, the fatty acids of hydrogenated castor oil, erucic acid, coconut oil fatty acid, etc., as well as mixtures thereof. Metal carboxylates typically constitute from about 0.05 wt. % to about 5 wt. %, in some embodiments from about 0.1 wt. % to about 2 wt. %, and in some embodiments, from about 0.2 wt. % to about 1 wt. % of the polymer composition. Without intending to be limited by theory, it is believed that the metal atom in the carboxylate can act as a Lewis acid that accepts electrons from the oxygen atom located in the epoxy functional group of the impact modifier. Once it reacts with the carboxylate, the functional group becomes activated and can be readily attacked at either carbon atom in the three-membered ring via nucleophilic substitution, thereby acceleration the reaction between the chains of the impact modifier.

D. Other Components

The composition can also include one or more additives as are generally known in the art, such as fillers (e.g., particulate fillers, fibers, etc.), organosilane compounds, colorants, flame retardants, nucleating agents, coupling agents, stabilizers (e.g., UV stabilizers, UV absorbers, heat stabilizers, etc.), lubricants, antioxidants, flow promoters, etc. to enhance properties and/or processability.

In one embodiment, for example, the polymer composition may contain an inorganic filler (e.g., fibrous filler, particulate filler, etc.). Such fillers may constitute from 1 to about 40 parts by weight, in some embodiments from about 2 to about 30 parts by weight, and in some embodiments, from about 4 to about 25 parts by weight per 100 parts by weight of polyarylene sulfides employed in the composition. For instance, the fillers may constitute from about 0.5 wt. % to about 30 wt. %, in some embodiments from about 1 wt. % to about 25 wt. %, and in some embodiments, from about 2 wt. % to about 20 wt. % of the composition. The fibrous filler generally may, for instance, contain fibers a high degree of tensile strength relative to their mass. For example, the ultimate tensile strength of the fibers (determined in accordance with ASTM D2101) is typically from about 1,000 to about 15,000 MPa, in some embodiments from about 2,000 MPa to about 10,000 MPa, and in some embodiments, from about 3,000 MPa to about 6,000 MPa. The high strength fibers may be formed from materials that are also electrically insulative in nature, such as glass, ceramics (e.g., alumina or silica), etc., as well as mixtures thereof. Glass fibers are particularly suitable, such as E-glass, A-glass, C-glass, D-glass, AR-glass, R-glass, S1-glass, S2-glass, etc., and mixtures thereof. The fibers may also have a relatively high length. For example, the fibers may have a volume average length of from about 1 to about 400 micrometers, in some embodiments from about 80 to about 250 micrometers, in some embodiments about 100 to about 200 micrometers, and in some embodiments, from about 110 to about 180 micrometers. The fibers may also have a narrow length distribution. That is, at least about 70% by volume of the fibers, in some embodiments at least about 80% by volume of the fibers, and in some embodiments, at least about 90% by volume of the fibers have a length within the range of from about 1 to about 400 micrometers, in some embodiments from about 80 to about 250 micrometers, in some embodiments from about 100 to about 200 micrometers, and in some embodiments, from about 110 to about 180 micrometers. In addition to possessing the length characteristics noted above, the fibers may also have a relatively high aspect ratio (average length divided by nominal diameter) to help improve the mechanical properties of the resulting polymer composition. For example, the fibers may have an aspect ratio of from about 2 to about 50, in some embodiments from about 4 to about 40, and in some embodiments, from about 5 to about 20 are particularly beneficial. The fibers may, for example, have a nominal diameter of about 5 to about 35 micrometers, and in some embodiments, from about 8 to about 30 micrometers.

The polymer composition may also contain an organosilane compound to help improve the compatibility between the polyarylene sulfide and other components (e.g., fibrous filler). When employed, such organosilane compounds typically constitute from 0.01 to about 5 parts by weight, in some embodiments from about 0.02 to about 2 by weight, and in some embodiments, from about 0.05 to about 1 part by weight per 100 parts by weight of polyarylene sulfides employed in the composition, as well as from about 0.01 wt. % to about 3 wt. %, in some embodiments from about 0.02 wt. % to about 1 wt. %, and in some embodiments, from about 0.05 to about 0.5 wt. % of the polymer composition. The organosilane compound may, for example, be any alkoxysilane as is known in the art, such as vinylalkoxysilanes, epoxyalkoxysilanes, aminoalkoxysilanes, mercaptoalkoxysilanes, and combinations thereof. In one embodiment, for instance, the organosilane compound may have the following general formula:

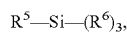

wherein, $R^5$ is a sulfide group (e.g., —SH), an alkyl sulfide containing from 1 to 10 carbon atoms (e.g., mercaptopropyl, mercaptoethyl, mercaptobutyl, etc.), alkenyl sulfide containing from 2 to 10 carbon atoms, alkynyl sulfide containing from 2 to 10 carbon atoms, amino group (e.g., $NH_2$), aminoalkyl containing from 1 to 10 carbon atoms (e.g., aminomethyl, aminoethyl, aminopropyl, aminobutyl, etc.); aminoalkenyl containing from 2 to 10 carbon atoms, aminoalkynyl containing from 2 to 10 carbon atoms, and so forth;

$R^6$ is an alkoxy group of from 1 to 10 carbon atoms, such as methoxy, ethoxy, propoxy, and so forth.

Some representative examples of organosilane compounds that may be included in the mixture include mercaptopropyl trimethyoxysilane, mercaptopropyl triethoxysilane, aminopropyl triethoxysilane, aminoethyl triethoxysilane, aminopropyl trimethoxysilane, aminoethyl trimethoxysilane, ethylene trimethoxysilane, ethylene triethoxysilane, ethyne trimethoxysilane, ethyne triethoxysilane, aminoethylaminopropyltrimethoxysilane, 3-aminopropyl triethoxysilane, 3-aminopropyl trimethoxysilane, 3-aminopropyl methyl dimethoxysilane or 3-aminopropyl methyl diethoxysilane, N-(2-aminoethyl)-3-aminopropyl trimethoxysilane, N-methyl-3-aminopropyl trimethoxysilane, N-phenyl-3-aminopropyl trimethoxysilane, bis(3-aminopropyl) tetramethoxysilane, bis(3-aminopropyl) tetraethoxy disiloxane, γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane, γ-diallylaminopropyltrimethoxysilane, etc., as well as combinations thereof. Particularly suitable organosilane compounds are 3-aminopropyltriethoxysilane and 3-mercaptopropyltrimethoxysilane.

Regardless of the components employed, a variety of different techniques may be employed in the present invention to form the polymer composition. In one embodiment, for example, the polymer composition may be formed by melt processing the polyarylene sulfide, impact modifier, and optional catalyst at a temperature of from about 50° C. to about 500° C., in some embodiments from about 100° C. to about 400° C., and in some embodiments, from about 150° C. to about 350° C. The materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the components may be fed to the same or different feeding ports of a twin-screw extruder and melt blended to form a substantially homogeneous melted mixture. Melt blending may occur under high shear/pressure to ensure sufficient dispersion. For example, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

If desired, one or more distributive and/or dispersive mixing elements may be employed within the mixing section of the melt processing unit. Suitable distributive mixers may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further increased in aggressiveness by using pins in the barrel that create a folding and reorientation of the polymer melt, such as those used in Buss Kneader extruders, Cavity Transfer mixers, and Vortex Intermeshing Pin mixers. The speed of the screw can also be controlled to improve the characteristics of the composition. For instance, the screw speed can be about 400 rpm or less, in one embodiment, such as between about 200 rpm and about 350 rpm, or between about 225 rpm and about 325 rpm. In one embodiment, the compounding conditions can be balanced so as to provide a polymer composition that exhibits improved impact and tensile properties. For example, the compounding conditions can include a screw design to provide mild, medium, or aggressive screw conditions. For example, system can have a mildly aggressive screw design in which the screw has one single melting section on the downstream half of the screw aimed towards gentle melting and distributive melt homogenization. A medium aggressive screw design can have a stronger melting section upstream from the filler feed barrel focused more on stronger dispersive elements to achieve uniform melting. Additionally, it can have another gentle mixing section downstream to mix the fillers. This section, although weaker, can still add to the shear intensity of the screw to make it stronger overall than the mildly aggressive design. A highly aggressive screw design can have the strongest shear intensity of the three. The main melting section can be composed of a long array of highly dispersive kneading blocks. The downstream mixing section can utilize a mix of distributive and intensive dispersive elements to achieve uniform dispersion of all type of fillers. The shear intensity of the highly aggressive screw design can be significantly higher than the other two designs. In one embodiment, a system can include a medium to aggressive screw design with relatively mild screw speeds (e.g., between about 200 rpm and about 300 rpm).

Regardless of the particular manner in which the components are blended, the compatibility and distribution of the polyarylene sulfide and impact modifier can be significantly improved. For example, the impact modifier is capable of being dispersed within the polymer composition in the form of discrete domains of a nano-scale size. For example, the domains may have an average cross-sectional dimension of from about 1 to about 1000 nanometers, in some embodiments from about 5 to about 800 nanometers, in some embodiments from about 10 to about 500 nanometers. The domains may have a variety of different shapes, such as elliptical, spherical, cylindrical, plate-like, tubular, etc. Such improved dispersion can result in either better mechanical properties, or allow for equivalent mechanical properties to be achieved at lower amounts of impact modifier.

II. Ammunition Cartridge

As indicated above, the polymer composition is used in the formation of an ammunition cartridge. As used herein, the term "ammunition" may refer to a complete, assembled round or cartridge that is ready to be loaded into a firearm and fired, including cap, casing, propellant, projectile, etc. Ammunition may be a live round fitted with a projectile, or a blank round with no projectile and may also be other types such as non-lethal rounds, rounds containing rubber bullets, rounds containing multiple projectiles (shot), and rounds containing projectiles other than bullets such as fluid-filled canisters, tracers, armor piercing, incendiary or capsules. Ammunition may be any caliber of pistol or rifle ammunition. Non limiting examples include 5.56 mm, 7.62 mm, 308, 338, 3030, 3006, 50 caliber, 45 caliber, 380 caliber, 38 caliber, 9 mm, 10 mm, 12.7 mm, 14.5 mm, 14.7 mm, 20 mm, 25 mm, 30 mm, 40 mm, 57 mm, 60 mm, 75 mm, 76 mm, 81 mm, 90 mm, 100 mm, 105 mm, 106 mm, 115 mm, 120 mm, 122 mm, 125 mm, 130 mm, 152 mm, 155 mm, 165 mm, 175 mm, 203 mm, 460 mm, 8 inch, or 4.2 inch. The projectile may have any profile but generally has an aerodynamic streamlined shape at the head and at the tail, e.g., sabot, spritzer, flat base spritzer, boat tail spritzer, tapered-heel spritzer, rounded nose, rounded nose flat base, rounded nose boat tail, rounded nose tapered-heel, flat nose, flat nose flat base, flat nose boat tail, flat nose tapered-heel, hollow point, hollow point boat tail, hollow point flat base, hollow point tapered-heel and so on. Although any head shape can be used, more common shapes include spritzer shape, round, conical, frustoconical, blunted, wadcutter, or hollow point, and the more common tail shape includes flat base, boat tail, tapered-heel expanded bases or banded bases. The bullets of the present invention may have any profile and weight dictated by the particular application.

Regardless of the type of ammunition, the cartridge contains a casing body that defines a hollow interior, which may be defined between an open projectile-end and an opposing end. The hollow interior is configured to hold the propellant charge, primer, and/or a projectile. For example, the propellant may be disposed and confined within the hollow casing body and a primer may be disposed at the first end of the casing body in combustible communication with the propellant. The casing body may have a variety of different shapes and/or sizes, but is typically substantially cylindrical in shape. A variety of different techniques may be used to form the casing body, such as extrusion, injection molding, blow-molding, thermoforming, foaming, compression molding, hot-stamping, fiber spinning, pultrusion and so forth. In certain embodiments, for instance, the casing body may be formed by a molding technique, such as injection molding, compression molding, nanomolding, overmolding, blow molding, etc. As is known in the art, injection molding can occur in two main phases—i.e., an injection phase and holding phase. During the injection phase, the mold cavity is completely filled with the molten polymer composition. The holding phase is initiated after completion of the injection phase in which the holding pressure is controlled to pack additional material into the cavity and compensate for volumetric shrinkage that occurs during cooling. After the shot has built, it can then be cooled. Once cooling is complete, the molding cycle is completed when the mold opens and the part is ejected, such as with the assistance of ejector pins within the mold.

The casing body may be monolithic in that is formed from a single component. Alternatively, the casing body may be a "multi-piece" part that is formed from multiple components, which may be formed from the same or different polymer composition. In one embodiment, for example, the casing body may be a "two-piece" casing that contains a substantially cylindrical base component and head component. In such embodiments, the base component may have opposing first and second ends, wherein the first end may be closed and have a primer hole, and the second end may have a first coupling element. The head component may likewise have opposing third and fourth ends, the third end of which has a second coupling element that is a mate for the first coupling element and thus joins the third end of the head component to the second end of the base component. The fourth end of the head component may be open for receiving a projectile. If desired, the polymer composition of the present invention may be employed in the base component and/or the head component. Of course, it should be understood that the polymer composition may have different relative concentrations and/or different components depending on the particular component for which it is employed. In another embodiment, the casing body may be a "three-piece" casing that contains a substantially cylindrical base component, head component, and middle component positioned between the base component and the head component. In such embodiments, the base component may have opposing first and second ends, wherein the first end may be closed and have a primer hole, and the second end has a first coupling element. The middle component may likewise have opposing third and fourth ends, the third end of which has a second coupling element that is a mate for the first coupling element and thus joins the third end of the middle component to the second end of the base component. The fourth end of the middle component also has a third coupling element. The head component may have an open end and an opposing end with a fourth coupling element that is a mate for the third coupling element of the middle component, which thus joins the fourth end of the middle component to the open end of the head component. If desired, the polymer composition of the present invention may be employed in the base component, middle component, and/or the head component. Of course, it should be understood that the polymer composition may have different relative concentrations and/or different components depending on the particular component for which it is employed.

Figure 2:
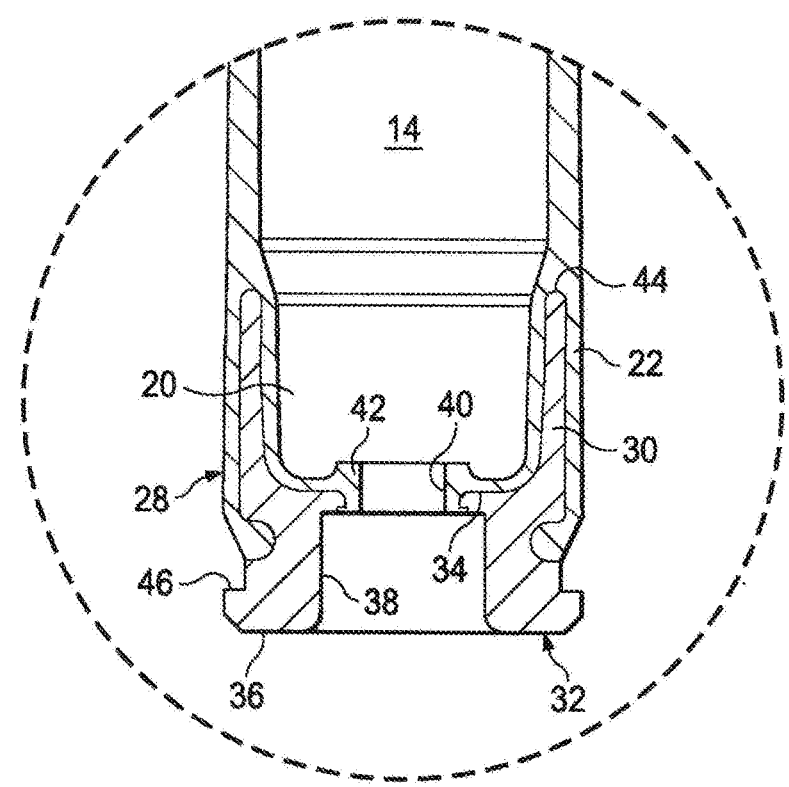
FIG. 2 is an exploded view of a portion of the ammunition cartridge of FIG. 1.
Figure 3:
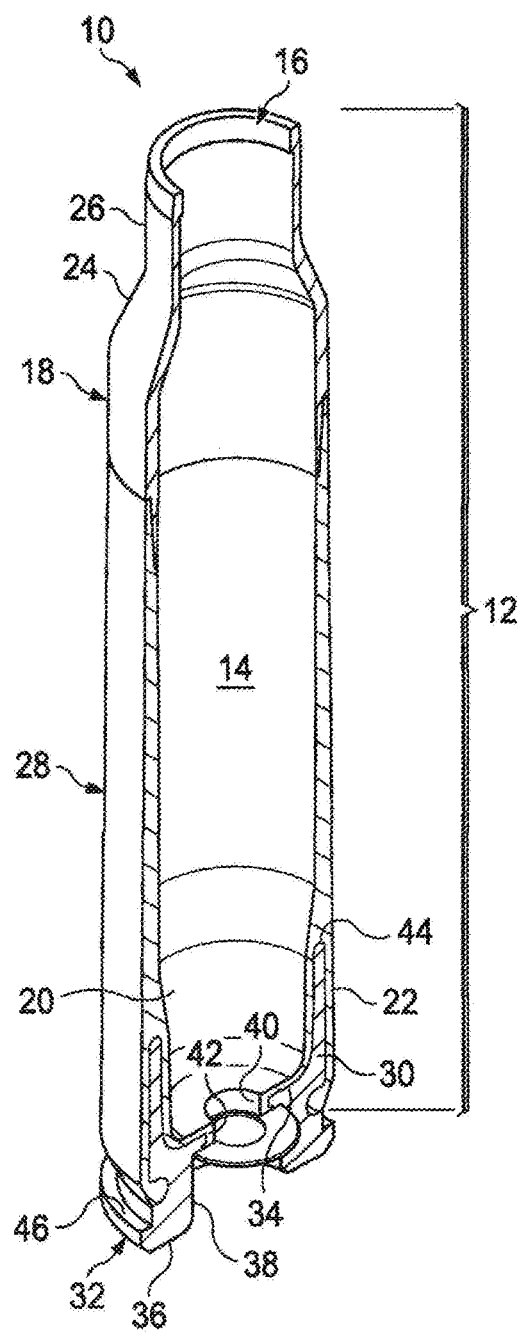
FIG. 3 is a cut-away perspective view of the ammunition case of FIG. 1.

Referring to FIGS. 1-3, for instance, one particular embodiment of such a "multi-piece" ammunition cartridge 10 is shown in more detail. In this particular embodiment, the cartridge 10 is particularly suited for a high velocity refile and contains a casing body 12 showing a powder chamber 14 within which a projectile (not shown) can be inserted via a projectile-end opening 16. The head component 18 may be formed from the polymer composition of the present invention, and typically has a wall thickness of from about 0.003 and about 0.2 inches, in some embodiments from about 0.005 to about 0.15 inches, and in some embodiments, from about 0.01 to about 0.1 inches. The forward end of head component 18 has a shoulder 24 forming a chamber neck 26. The casing body 12 may also have a substantially cylindrical open-ended middle component 28 extending from the head component 18 to an opposite end 20. The middle component 28 may be formed from the polymer composition of the present invention, which may be the same or different from the head component 18. Typically, the middle component 28 has a wall thickness of from about 0.003 and about 0.2 inches, in some embodiments from about 0.005 to about 0.15 inches, and in some embodiments, from about 0.01 to about 0.1 inches.

The middle component 28 may be connected to a substantially cylindrical insert 32, which acts as the base component of the casing body 12. More particularly, the middle component 28 may contain a coupling end 22 formed on an end 20. The middle component 28 is connected to a a substantially cylindrical primer insert 32 via a substantially cylindrical coupling element 30 that extends from a bottom surface 34 to an opposing top surface 36. The insert 32 may be formed from the polymer composition of the present invention, which may be the same or different from the head component 18 and/or the middle component 28. A primer recess 38 may be located in the top surface 36 that extends toward the bottom surface 34, and a primer flash hole 40 likewise extends through the bottom surface 34 into the powder chamber 14. The coupling end 22 extends through the primer flash hole 40 to form an aperture coating 42 while retaining a passage from the top surface 36 through the bottom surface 34 and into the powder chamber 14 to provide support and protection about the primer flash hole 40. The coupling element 30 also extends with a taper to a tip 44. In this manner, contact between the coupling end 22 with the tip 44 and within the primer flash hole 40 can form a physical interlock between the insert 32 and the middle component 28.

The interior volume of powder chamber 14 may be varied to provide the volume necessary for complete filling of the chamber 14 by the propellant chosen so that a simplified volumetric measure of propellant can be utilized when loading the cartridge. Either a particulate or consolidated propellant can be used. The insert 32 also has a flange 46 cut therein and a primer recess 38 formed therein for ease of insertion of the primer (not shown). The primer recess 38 is sized so as to receive the primer (not shown) in an interference fit during assembly. The primer flash hole 40 communicates through the bottom surface 34 of the insert 32 into the powder chamber 14 so that upon detonation of primer (not shown), the powder in the chamber 14 will be ignited. A projectile or bullet (not shown) may be held in place within the chamber case neck 26 at the projectile-end opening 16 by an interference fit. Mechanical crimping can also be applied to increase the bullet pull force. The projectile may be inserted into place following the completion of the filling of powder chamber 14, or can also be injection molded directly onto the projectile-end opening 16 prior to welding or bonding together using solvent, adhesive, spin-welding, vibration-welding, ultrasonic-welding or laser-welding techniques. The welding or bonding increases the joint strength so the casing can be extracted from the hot gun casing after firing at the cook-off temperature. The projectile-end and bullet components can then be welded or bonded together using solvent, adhesive, spin-welding, vibration-welding, ultrasonic-welding or laser-welding techniques. The welding or bonding increases the joint strength so the casing can be extracted from the hot gun casing after firing at the cook-off temperature. An optional first and second annular groove (cannelure) may be provided in the projectile-end in the interlock surface of the male coupling element to provide a snap-fit between the two components. The cannelures formed in a surface of the bullet at a location determined to be the optimal seating depth for the bullet.

The present invention may be better understood with reference to the following examples.

Test Methods

Notched Charpy Impact Strength: Notched Charpy properties may be determined in accordance with ISO Test No. 179-1:2010 (technically equivalent to ASTM D256, Method B). This test may be run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature may be 23° C. or −30° C.

Tensile Properties: Tensile modulus and strength may be determined in accordance with ISO Test No. 527:2012 (technically equivalent to ASTM D638). Measurements are made on a test strip sample having a length of 80 mm, thickness of 10 mm, and width of 4 mm. The testing temperature is 23° C. and the testing speed is 5 mm/min.

Melt Viscosity: Melt viscosity may be determined in accordance with ISO Test No. 11443:2005 at a temperature of about 310° C. and at a shear rate of 1,200 $s^{-1}$ using a Dynisco 7001 capillary rheometer. The rheometer orifice (die) had a diameter of 1 mm, length of 20 mm, L/D ratio of 20.1, and an entrance angle of 180°. The diameter of the barrel was 9.55 mm±0.005 mm and the length of the rod was 233.4 mm.

Materials Employed

PPS 1: FORTRON® 0214 linear polyphenylene sulfide (Celanese);

Impact Modifier 1: LOTADER® AX8900—a random copolymer of ethylene, methyl acyrlate, and glycidyl methacrylate available from Arkema (glycidyl methacrylate content of 8 wt. %, methyl acrylate content of 24 wt. %, melt index of 6 g/10 min at 190° C.);

Impact Modifier 2: ELVALOY® PTW—a terpolymer of ethylene, butyl acrylate, and glycidyl methacrylate available from Dow (glycidyl methacrylate content of 5 wt. %, melt flow index of 12 g/10 min at 190° C.);

Impact Modifier 3: LOTADER® AX8840—a random copolymer of ethylene and glycidyl methacrylate available from Arkema (glycidyl methacrylate content of 8 wt. %, melt index of 5 g/10 min at 190° C.);

Catalyst: Zinc Stearate; and
Lubricant: GLYCOLUBE® P available from Lonza.

EXAMPLE 1

Various samples are melt mixed using a 32 mm Coperion co-rotating, fully-intermeshing, twin-screw extruder with ten temperature control zones including one at the die. The polyarylene sulfide, impact modifiers, catalyst, and lubricant are fed to the main feed throat in the first barrel by means of a gravimetric feeder. The materials are further mixed then extruded through a strand die. The strands are water-quenched in a bath to solidify and granulated in a pelletizer. The resulting compositions are set forth in more detail in Tables 1-2 below.

TABLE 1

|  | Example | | | | | |
| --- | --- | --- | --- | --- | --- | --- |
|  | 1 | 2 | 3 | 4 | 5 | 6 |
| PPS-1 (wt. %) | 92.1 | 89.6 | 92.1 | 89.6 | 92.1 | 89.6 |
| Impact Modifier 1 (wt. %) | — | — | — | — | 7.5 | 10 |
| Impact Modifier 2 (wt. %) | — | — | 7.5 | 10 | — | — |
| Impact Modifier 3 (wt. %) | 7.5 | 10 | — | — | — | — |
| Catalyst (wt. %) | 0.1 | 0.1 | 0.1 | 0.1 | 0.1 | 0.1 |
| Lubricant (wt. %) | 0.3 | 0.3 | 0.3 | 0.3 | 0.3 | 0.3 |

TABLE 2

|  | Example | | | | | |
| --- | --- | --- | --- | --- | --- | --- |
|  | 1 | 2 | 3 | 4 | 5 | 6 |
| PPS-1 (parts) | 100 | 100 | 100 | 100 | 100 | 100 |
| Impact Modifier 1 (parts) | — | — | — | — | 8.1 | 11.1 |
| Impact Modifier 2 (parts) | — | — | 8.1 | 11.1 | — | — |
| Impact Modifier 3 (parts) | 8.1 | 11.1 | — | — | — | — |
| Epoxy Content (parts by weight of glycidyl methacrylate) | 0.65 | 0.89 | 0.41 | 0.56 | 0.65 | 0.89 |
| Catalyst (parts) | 0.1 | 0.1 | 0.1 | 0.1 | 0.1 | 0.1 |
| Lubricant (parts) | 0.3 | 0.3 | 0.3 | 0.3 | 0.3 | 0.3 |

Following formation, the samples are tested for a variety of physical characteristics. The results are set forth in Table 3 below.

TABLE 3

|  | Example | | | | | |
| --- | --- | --- | --- | --- | --- | --- |
|  | 1 | 2 | 3 | 4 | 5 | 6 |
| Melt Viscosity (kP) at 1,200 s$^{-1}$ | 2,490 | 3,174 | 2,005 | 2,257 | 1,885 | 2,098 |
| Tensile Modulus (MPa) | 2,709 | 2,520 | 2,659 | 2,441 | 2,697 | 2,448 |
| Tensile Strength (MPa) | 67 | 62 | 64 | 58 | 68 | 63 |
| Charpy Notched Impact Strength (kJ/m$^2$) at 23° C. | 9.8 | 31.2 | 13.0 | 48.0 | 7.0 | 9.0 |
| Charpy Notched Impact Strength (kJ/m$^2$) at −30° C. | 7.7 | 8.0 | 6.5 | 8.9 | 5.6 | 6.8 |

EXAMPLE 2

Various samples are melt mixed using a 32 mm Coperion co-rotating, fully-intermeshing, twin-screw extruder with ten temperature control zones including one at the die. The polyarylene sulfide, impact modifier, glass fibers, organosilane compound, catalyst, mold release agent, and lubricant are fed to the main feed throat in the first barrel by means of a gravimetric feeder. The materials are further mixed then extruded through a strand die. The strands are water-quenched in a bath to solidify and granulated in a pelletizer. The resulting compositions are set forth in more detail in Tables 3-4 below.

TABLE 3

|  | Example | |
| --- | --- | --- |
|  | 7 | 8 |
| PPS-1 (wt. %) | 75.3 | 85 |
| Impact Modifier 2 (wt. %) | — | 9.0 |
| Impact Modifier 3 (wt. %) | 7.5 | — |
| Glass Fibers (wt. %) | 15.0 | 5.0 |
| Mold Release Agent (wt. %) | 2.0 | 0.5 |
| Catalyst (wt. %) | — | 0.1 |
| Organosilane (wt. %) | 0.2 | 0.1 |
| Lubricant (wt. %) | — | 0.3 |

TABLE 4

|  | Example | |
| --- | --- | --- |
|  | 7 | 8 |
| PPS-1 (parts) | 100 | 100 |
| Impact Modifier 2 (parts) | — | 10.6 |
| Impact Modifier 3 (parts) | 10.0 | — |
| Epoxy Content (parts by weight of glycidyl methacrylate) | 0.80 | 0.53 |
| Glass Fibers (parts) | 19.9 | 5.9 |
| Mold Release Agent (parts) | 2.7 | 0.6 |
| Catalyst (parts) | — | 0.1 |
| Organosilane (parts) | 0.3 | 0.1 |
| Lubricant (parts) | — | 0.3 |

Following formation, the samples are tested for a variety of physical characteristics. The results are set forth in Table 5 below.

TABLE 5

|  | Example | |
| --- | --- | --- |
|  | 7 | 8 |
| Melt Viscosity (kP) at 1,200 s$^{-1}$ | 5,084 | 3,264 |
| Tensile Modulus (MPa) | 5,584 | 3,367 |
| Tensile Strength (MPa) | 93 | 64 |
| Charpy Notched Impact Strength (kJ/m$^2$) at 23° C. | 8.1 | 10.5 |

These and other modifications and variations to the present disclosure may be practiced by those of ordinary skill in the art, without departing from the spirit and scope of the present disclosure. In addition, it should be understood the aspects of the various embodiments may be interchanged, either in whole or in part. Furthermore, those of ordinary skill in the art will appreciate that the foregoing description is by way of example only, and is not intended to limit the disclosure.

What is claimed is:

1. An ammunition cartridge comprising a casing body that defines a hollow interior configured to receive a projectile, wherein the casing body contains a polymer composition that includes a polyarylene sulfide and an impact modifier, the impact modifier including an epoxy-functionalized polymer, and further wherein the polymer composition exhibits a notched Charpy impact strength of about 6 kJ/m$^2$ or more as determined at a temperature of 23° C. in accordance with ISO Test No. 179-1:2010.

2. The ammunition cartridge of claim 1, wherein the polymer composition exhibits notched Charpy impact strength of about 5 kJ/m$^2$ or more as determined at a temperature of −30° C. in accordance with ISO Test No. 179-1:2010.

3. The ammunition cartridge of claim 1, wherein the polymer composition exhibits a tensile modulus of about 6,000 MPa or less as determined at a temperature of 23° C. in accordance with ISO Test No. 527:2012.

4. The ammunition cartridge of claim 1, wherein the polymer composition exhibits a melt viscosity of about 6,000 kP or less as determined in accordance with ISO Test No. 11443:2005 at a temperature of about 310° C. and at a shear rate of 1,200 s$^{-1}$.

5. The ammunition cartridge of claim 1, wherein polyarylene sulfides constitute from about 50 wt. % to about 98 wt. % of the polymer composition.

6. The ammunition cartridge of claim 1, wherein the polyarylene sulfide is a polyphenylene sulfide.

7. The ammunition cartridge of claim 6, wherein the polyarylene sulfide is a linear polyphenylene sulfide.

8. The ammunition cartridge of claim 1, wherein impact modifiers constitute from 1 to about 50 parts by weight per 100 parts by weight of the polyarylene sulfides employed in the polymer composition.

9. The ammunition cartridge of claim 1, wherein the polymer composition has an epoxy content of the composition of from about 0.3 to about 1.2 parts by weight per 100 parts by weight of polyarylene sulfides in the polymer composition.

10. The ammunition cartridge of claim 1, wherein the polymer composition has an epoxy content of the composition of from about 0.5 to about 0.9 parts by weight per 100 parts by weight of polyarylene sulfides in the polymer composition.

11. The ammunition cartridge of claim 1, wherein the epoxy-functionalized polymer contains an epoxy-functionalized (meth)acrylic monomeric component.

12. The ammunition cartridge of claim 11, wherein the epoxy-functionalized (meth)acrylic monomeric component is formed from glycidyl acrylate, glycidyl methacrylate, or a combination thereof.

13. The ammunition cartridge of claim 11, wherein the epoxy-functionalized polymer further includes an α-olefin monomeric component.

14. The ammunition cartridge of claim 13, wherein the α-olefin monomeric component constitutes from about 55 wt. % to about 95 wt. % of the polymer, and the epoxy-functional (meth)acrylic monomeric component constitutes from about 1 wt. % to about 20 wt. % of the polymer.

15. The ammunition cartridge of claim 14, wherein the epoxy-functionalized polymer further includes a non-epoxy functional (meth)acrylic monomeric component in an amount of from about 5 wt. % to about 35 wt. % of the polymer.

16. The ammunition cartridge of claim 1, wherein the epoxy-functionalized polymer has a melt flow index of from about 1 to about 30 grams per 10 minutes, as determined in accordance with ASTM D1238-13 at a load of 2.16 kg and temperature of 190° C.

17. The ammunition cartridge of claim 1, wherein the polymer composition further comprises a catalyst.

18. The ammunition cartridge of claim 17, wherein the catalyst includes a metal carboxylate.

19. The ammunition cartridge of claim 18, wherein the metal carboxylate is a metal salt of a fatty acid.

20. The ammunition cartridge of claim 19, wherein the salt contains a divalent metal cation.

21. The ammunition cartridge of claim 18, wherein the fatty acid has a carbon chain length of from 8 to 22 carbon atoms.

22. The ammunition cartridge of claim 1, wherein the impact modifier is dispersed within the polymer composition in the form of discrete domains having an average size of from about 1 to about 1,000 nanometers.

23. The ammunition cartridge of claim 1, further comprising an inorganic filler in an amount of from about 1 to about 40 parts by weight per 100 parts by weight of polyarylene sulfides in the polymer composition.

24. The ammunition cartridge of claim 23, wherein the inorganic filler includes glass fibers.

25. The ammunition cartridge of claim 1, wherein a propellant is disposed within the hollow interior of the casing body, and further wherein a primer is disposed in the casing body in combustible communication with the propellant.

26. The ammunition cartridge of claim 25, wherein a projectile is disposed within the hollow interior of the casing body.

27. The ammunition cartridge of claim 1, wherein the casing body is substantially cylindrical.

28. The ammunition cartridge of claim 1, wherein the casing body is formed from a single component.

29. The ammunition cartridge of claim 1, wherein the casing body is formed from multiple components.

30. The ammunition cartridge of claim 1, wherein the casing body contains a base component coupled to a head component that defines an open end for receiving the projectile.

31. The ammunition cartridge of claim 30, wherein the base component contains the polymer composition.

32. The ammunition cartridge of claim 30, wherein the head component contains the polymer composition.

33. The ammunition cartridge of claim 30, wherein the base component includes a primer insert.

34. The ammunition cartridge of claim 30, further comprising a middle component that is positioned between and coupled to the base component and the head component.

35. The ammunition cartridge of claim 34, wherein the middle component comprises the polymer composition.

* * * * *